United States Patent [19]

Molinaro

[11] Patent Number: 5,553,727
[45] Date of Patent: Sep. 10, 1996

[54] TAMPER-EVIDENT CAP AND NECK FINISH

[75] Inventor: Luca Molinaro, New Castle, Pa.

[73] Assignee: Consumer Cap Corporation, New Castle, Pa.

[21] Appl. No.: 430,019

[22] Filed: Apr. 27, 1995

[51] Int. Cl.[6] .................................... B65B 7/28
[52] U.S. Cl. .................. 215/44; 215/45; 215/254; 215/318; 215/346; 215/354
[58] Field of Search .................................. 215/252, 254, 215/317, 318, 341, 346, 354, 44, 45

[56] References Cited

U.S. PATENT DOCUMENTS

| | | |
|---|---|---|
| 4,497,765 | 2/1985 | Wilde et al. . |
| 4,534,480 | 8/1985 | Santostasi et al. . |
| 4,561,553 | 12/1985 | Crisci . |
| 4,625,875 | 12/1986 | Carr et al. . |
| 4,785,952 | 11/1988 | Obadia ............................ 215/329 |
| 4,938,370 | 7/1990 | McBride ......................... 215/252 |
| 5,009,323 | 4/1991 | Montgomery et al. .......... 215/252 |
| 5,103,991 | 4/1992 | Collins ............................ 215/329 |
| 5,190,178 | 3/1993 | Luch . |
| 5,213,224 | 5/1993 | Luch . |
| 5,267,661 | 12/1993 | Luch et al. ...................... 215/256 |
| 5,307,945 | 5/1994 | Hidding et al. .................. 215/329 |
| 5,307,946 | 5/1994 | Molinaro ......................... 215/329 |

FOREIGN PATENT DOCUMENTS

0118267  10/1986  European Pat. Off. ........... 215/318

*Primary Examiner*—Stephen K. Cronin
*Attorney, Agent, or Firm*—Titus & McConomy

[57] ABSTRACT

A neck finish for a tamper evident bottle is disclosed having at least ten helically spaced threads which extend along a substantial length of the exterior wall of the neck. The neck finish may include one or two annular ring flanges to accept a snap-on cap. Also disclosed are tamper evident caps having at least ten helically spaced threads positioned on the inner surface of the cap. In one embodiment, the cap includes one or two annular ring flanges to engage the ring flanges on the disclosed neck finish. Another tamper evident cap includes ten helically spaced thread which are adapted to engage at least some portion of threads on a neck finish.

16 Claims, 6 Drawing Sheets

TAMPER-EVIDENT CAP AND NECK FINISH

FIELD OF THE INVENTION

The present invention relates to a neck finish particularly well suited for blow-molded containers and to novel snap-on snap-off caps which are screw-on screw-off and have a tamper evident locking feature.

BACKGROUND OF THE INVENTION

Tamper evident caps for containers, such as blow-molded or injection molded containers are well known, see e.g., U.S. Pat. Nos. 4,561,553, 4,625,875, 4,497,765, and 4,534,480. A number of caps are of the snap-on screw-off variety such as U.S. Pat. Nos. 5,190,178, 5,213,224 and 5,307,946. Generally, the prior art caps include a spiral thread or threads which match a spiral thread on the neck of the bottle. In the '946 patent, the cap and bottle neck include a seven lead-in end annular spiral threads or fastening means. The stated advantage of the multiple lead-in threads of the '946 patent is the increased ease of "snap-on" placement of the cap onto the threaded neck using standard bottle capping equipment and without an additional tightening step such as a final twist.

As is apparent from the prior art patents, a great deal of effort has gone into design of cap and bottle neck configurations to provide easy on and off use of the cap by the bottler and ultimately by the end user of the bottled product. However, notwithstanding this effort, the bottling industry continues to search for a cap and neck finish which achieves these objectives, but which also provides a secure seal. In addition, the ultimate consumer of the bottled product desires a cap which is easy to use both in removal from the bottle but also as reapplication on to the bottle.

Accordingly, it is an object of the present invention to provide a bottle neck finish and tamper evident cap for use therewith which is easy for the bottler to place on the filled container without additional tightening operations, but is substantially leak-proof. Also it is an objective of the invention to provide a container neck finish and cap which permits the end user to readily remove the cap after the tamper-evident means is removed by either lifting or twisting the cap from the neck. The present invention also permits the ultimate user to snap-on the cap or screw-on the cap to provide a leak-tight seal. A further object of the invention is to provide a neck finish for blow molded containers and a high or low density plastic bottle cap which can be snap or screw fit on to the container. It is also an object of the invention to provide a cap which snap fits onto a neck finish which does not have snap locks.

SUMMARY OF THE INVENTION

The present invention provides a novel neck finish for a container, especially a blow molded milk bottle, which includes an annular wall that defines a cylindrical opening therethrough. The annular wall includes a first and second end. The first end is typically open to the outside and the second end terminates at the container body. At the first end there is positioned an annular flange extending inwardly of the wall and preferably outwardly of the plane of the opening.

At least one set of ratchet teeth is positioned circumferentially around the outer surface of the annular wall at substantially its second end. The teeth are designed to engage a tamper evident ring associated with a cap used to sealingly close the opening of the neck.

The outer surface of the annular wall includes at least ten helically spaced threads. Each of the threads includes an end or terminus adjacent the first and second ends of the annular wall respectively. A first annular ring flange having a circumferential lip is preferably positioned between the terminus of the threads and the ratchet teeth. In a preferred embodiment of the invention, a second annular ring flange having a circumferential lip is position between the terminus of the threads and first end of the annular wall. The second annular ring flange is provided for additional locking security for the cap which has a cooperating flange.

The present invention also provides a novel cap, and in particular, a cap adapted to cooperatively engage the neck finish of the present invention. The cap includes a substantially rigid closure member having an annular wall depending from the periphery of said member. At the other end of said depending annular wall is positioned a tamper-evident tear-off band. This band is secured to the annular wall by means of frangible elements or a thin, tearable extension to or tear line on the annular wall. Preferably, the tamper-evident band includes ratchet teeth adapted to engage cooperative teeth on the bottle to which it is fit.

In one embodiment, the cap preferably includes an annular valve depending from the closure member. The valve is spaced apart from the annular wall and preferably includes a tapered section adapted to engage the inner neck of a bottle when inserted on the bottle neck. Preferably, the valve extends less than one-half the length of the depending annular wall of the cap.

Adjacent to the tamper-evident band is a first annular ring flange preferably having a lip circumferentially positioned about the ring and preferably configured to cooperatively engage an annular ring flange on the neck finish to fasten the cap to the neck finish. In a second preferred embodiment of the invention a second annular ring flange is positioned adjacent the closure member on the annular wall and spaced apart from the valve. In a preferred embodiment, the first and second annular ring flanges provide first and second fasteners for the cap when pushed onto the neck.

On the inner surface of the annular depending wall and extending from about the first annular ring flange to the closure member are at least ten helically positioned threads. The threads are adapted to engage the threads of the bottle finish either by screw fit or direct compressive force as the cap is "snapped" onto the neck finish.

In another embodiment of the invention, the cap is provided without annular ring flanges. In this embodiment the cap is preferably made from a high density plastic, e.g., polyethylene, and includes at least ten lead threads which are designed to slide over corresponding threads on the neck finish of a bottle. This embodiment provides a cap for bottlers so that they do not have to change their neck finishing equipment to accommodate a snap-on cap.

The present invention therefore provides a generic "snap-on" cap and a bottle finish and a cap that, when used in combination, affords enhanced application of the cap to the neck finish both by the end user of the bottle but by the filler/capper of the bottle. The invention facilitates the placement of the cap on the neck finish by pushing it on or snapping over the neck or by twisting. In either method, a leak free closure is provided to the bottle. Other advantages of the present invention will become apparent by a perusal of the following detailed description of a presently preferred embodiment of the invention taken in connection with the drawings.

PRESENTLY PREFERRED EMBODIMENT

Figure 1:
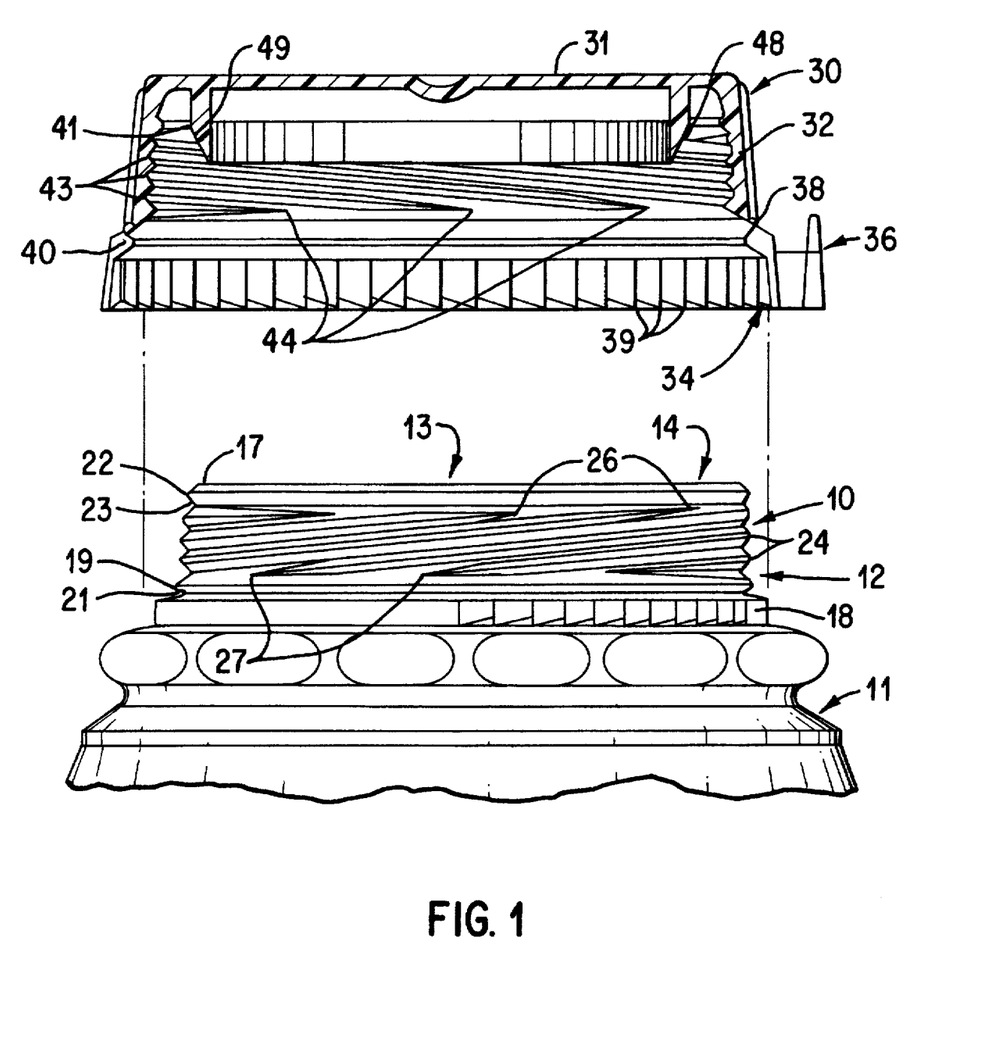
FIG. 1 is an elevation in partial section of a bottle neck finish and cap according to the present invention.
Figure 3:
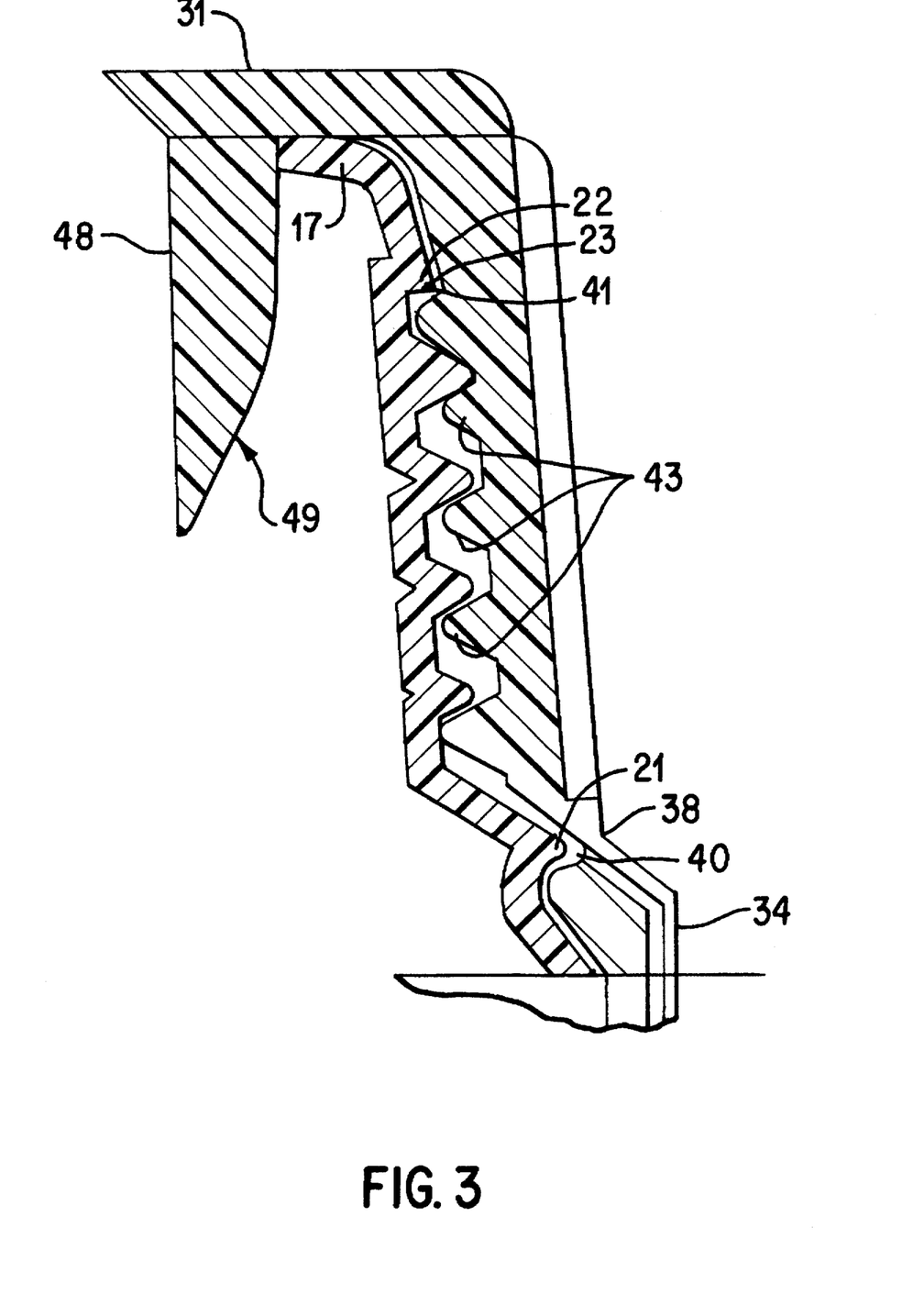
FIG. 3 is a partial section of the neck finish and cap shown in FIG. 1.

Referring to the drawings, the neck finish 10 of a bottle 11 is partially shown in FIG. 1. Neck finish 10 includes an annular wall 12 defining therethrough cylindrical opening 13 having a first end 14 and a second end 16. First end 14 provides access to opening 13. An annular flange 17 is provided at the first end of the annular wall and extends inwardly of the wall 12. Preferably the annular flange extends inwardly at a slight outward angle from the plane of the first end as shown in FIG. 3.

Positioned adjacent to second end 16 is at least one set of annular ratchet teeth 18 to provide a tamper evident grip for the cap. Ratchet teeth 18 maybe positioned around the entire circumference of the second or only a portion thereof. In one embodiment, it is preferred that the teeth of two different sets of teeth 18 be positioned in an opposing direction to prevent "backing off" the cap from the bottle. Ratchet teeth 18 are adapted to cooperatively engage corresponding teeth on a tamper-evident ring positioned on the base of mating cap.

A first annular ring flange 19 having a circumferential lip 21 (see FIG. 3) is positioned substantially adjacent to the plane in which the annular ratchet teeth 18 are provided. The annular ring flange is particularly useful when using a low density plastic cap. However, it is not desirable when using a high density cap. In a preferred embodiment of the invention, a second annular ring flange 22 having a circumferential lip 23 is provided proximate of the first end 14 of annular wall 11. These ring flanges provide a means for cooperating flanges on a cap to snap over and lock on to the bottle. Again, the second flange is not used when a high density polyethylene cap is to be used as the closurer.

Figure 6:
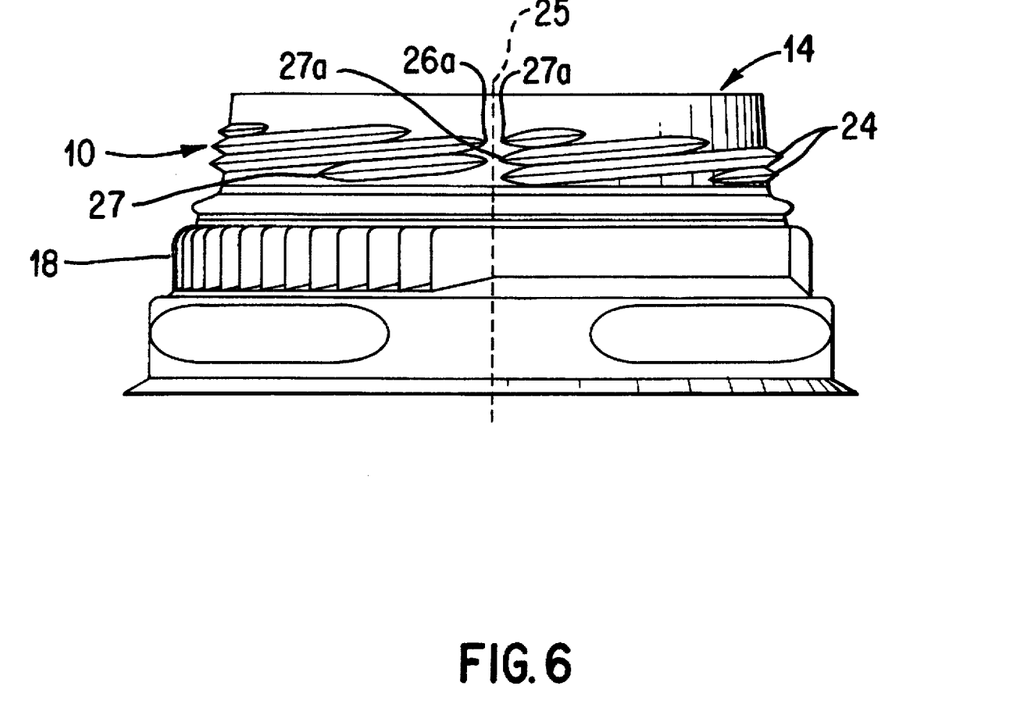
FIG. 6 is an elevation of a neck finish of the present invention using a part line.

Helically extending between the first end 14 or the second annular ring flange 22, when provided, and the first annular ring flange 19, are at least ten threads 24 terminating at points 26 and 27, adjacent first end 14 and first annular ring flange 19, respectively. Preferably, threads 24 are helically spaced in contiguous relationship as shown in FIG. 1. Preferably, each thread 24 extends less than 360° and more preferably less than 270° around the circumference of annular wall 11. However, as shown in FIG. 6, neck finish 10 is provided with a part line 25 (shown in dotted line) to facilitate removal of the neck from its mold. In this case, threads 24 are discontinuous or interrupted and include terminating point 26a and 27a.

The manufacture of neck finish 11 is particularly well suited to standard blow molding of milk container by substitution of the neck finish mold conforming to the present invention.

Figure 2:
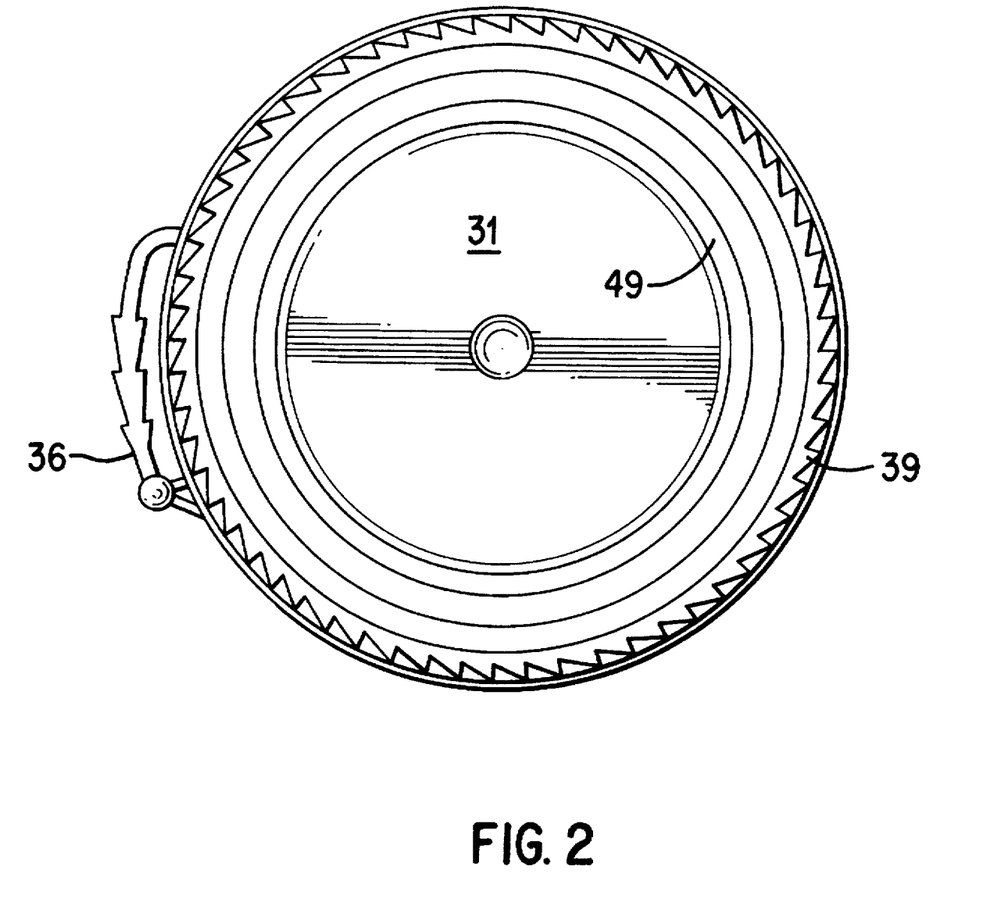
FIG. 2 is a plan view of the cap shown in FIG. 1.
Figure 5:
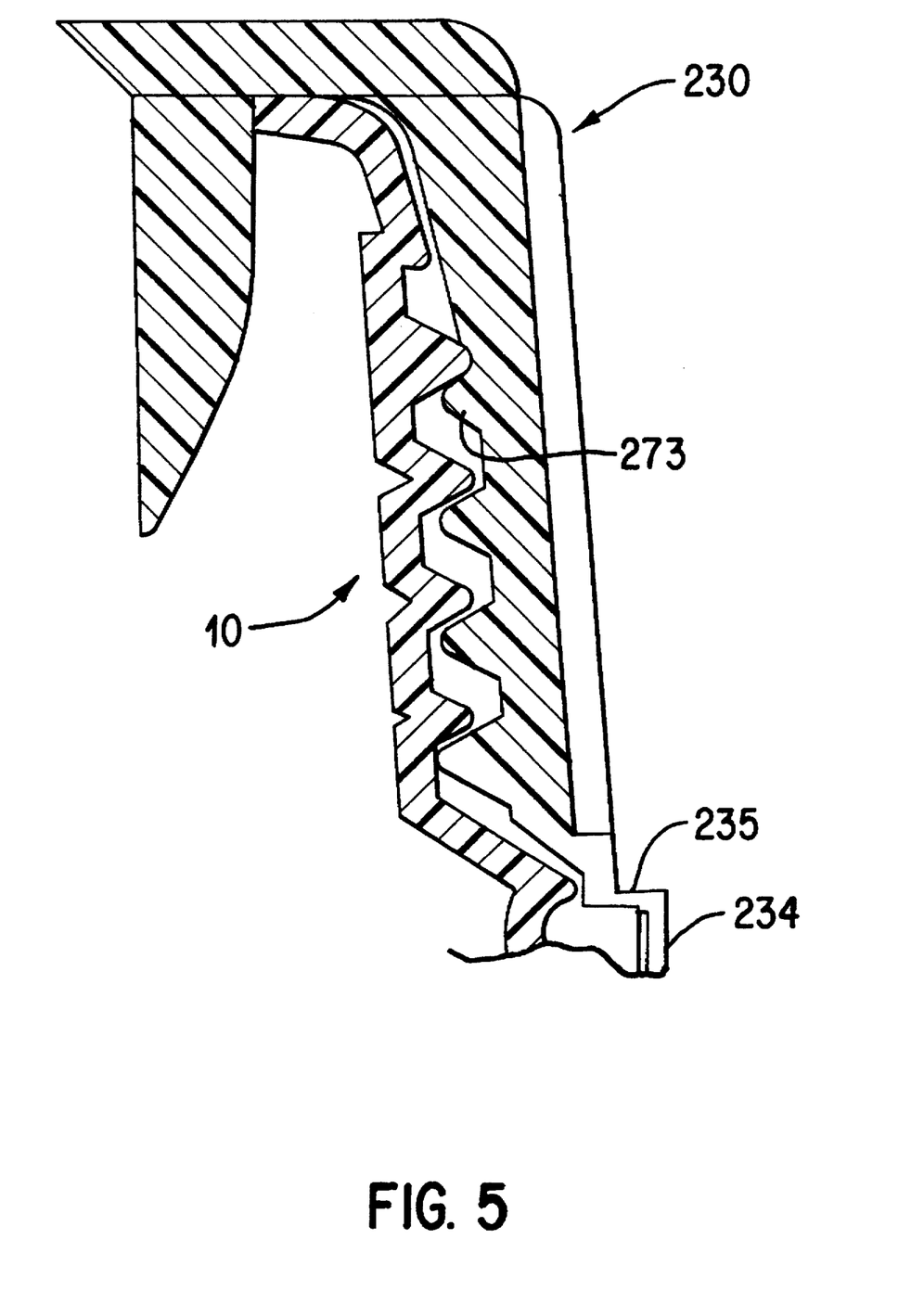
FIG. 5 is a partial section of a neck finish shown in FIG. 1 and a cap having no annular ring flange.

Another feature of the invention comprises cap 30 preferably made from a low or high density polypropylene. Cap 30 comprises a closure member 31 designed to cover the mouth or opening in a neck finish of a container such as neck finish 10 of the present invention. In a preferred embodiment of the invention, closure member 31 is substantially circular and includes depending annular wall 32. Annular wall 32 includes a tamper-evident band 34 around its other end. Tamper-evident band 34 includes a pull tab 36 which may be upwardly or downwardly extending. Tamper evident band 34 is preferably formed as a part of annular wall 32 with tear line 38 to permit tearing the band from the wall to allow removal of the cap from the neck finish. Tamper-evident band 34 includes ratchet teeth 39 adapted to engage teeth on the neck finish of a container, as shown in FIG. 2 and 34 can include frangible elements breakably securing them to the annular wall as is well known in the art as shown in FIG. 5.

Cap 30 includes a first annular lip or ring flange 40 positioned on the annular wall adjacent tear line 38. In a preferred embodiment a second annular lip or ring flange 41 is positioned on annular wall 32 proximate of closure element 31. First and second annular ring flanges 40 and 41 are preferably located and dimension to engage and cooperatively secure cap 30 on first and second ring flanges 21 and 23 of neck finish 10, respectively, when the cap is pushed onto the neck finish.

Extending from adjacent first annular lip 40 to proximate closure member 31, or when used adjacent second annular ring flanges 41, are at least ten helically space threads 43 on the inner surface of annular depending wall 32 each having respective lead openings 44 and 46. Preferably threads 43 extend less than 360° and more preferably less than 270° and most preferably less than 90° around the inner surface of annular depending wall 32.

Depending from closure member 31, is depending annular valve 48. Annular valve 48 is spaced apart from annular depending wall 32 a distance which is represented by the difference in the radial distance from the outer edge of annular wall 12 at its first end 14 and center of the opening 13 and the inner edge of annular wall 12 or flange 17 when used. Valve 48 extends a point slightly less than midpoint extend of threads 43. Preferably valve 48 includes a taper 49 which permits initial engagement of the valve to the inner periphery of the neck finish opening upon engagement of cap 30 prior to the engagement of the first annular lips of the neck finish and cap respectively.

Cap 30 when used in combination with neck finish 10 of the present invention permits both the placement and removal of the cap on the neck finish by pushing on or pulling off. By utilizing at least ten threads, it is not necessary to screw the cap on or off the neck. However, by twisting the cap it is possible to obtain an even more secure closure when used by the ultimate consumer, while at the same time providing a leak proof container at the capping station without the necessity of so twisting.

Figure 4:
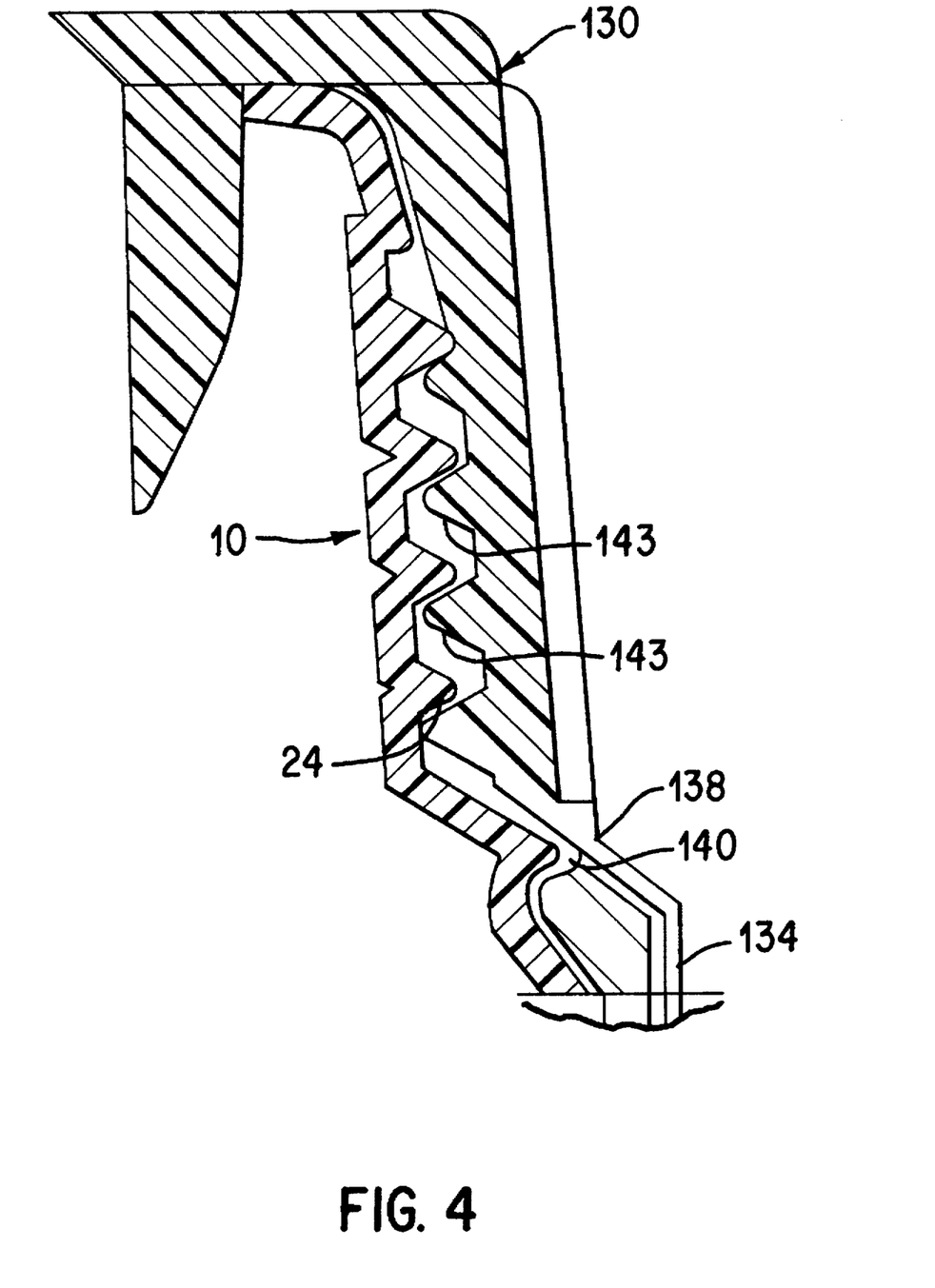
FIG. 4 is a partial section of neck finish and cap having only one annular ring flange.

In another embodiment, cap 130 in FIG. 4 includes only one annular ring flange 140. The use of only one annular ring flange provides substantially the same closure sealing as two, but eliminates the need for extensive neck finish modification where the molds are produced by separate manufacturers by eliminating the spacing requirement between the two annular ring flanges.

In the cap 230 shown in FIG. 5, no annular ring flanges are shown. This cap is screwed over the helical threads of the neck finish to engage the tamper evident band 234. It is preferred to secure the tamper evident bank 234 to annular wall 232 by means of frangible elements 235 which are breakable when tearing the band for removal. By using at least ten helical threads it is possible to provide a cap which is capable of snapping onto numerous existing threaded neck finishes to provide a secure leak proof package. In this embodiment a high density polyethylene material is used to achieve the objective.

While presently preferred embodiments of the invention have been shown and described in particularity, the invention may be otherwise embodied within the scope of the appended claims.

What is claimed is:

1. A neck finish for a container comprising:
   a. an annular wall with an outer surface and an inner surface defining a cylindrical opening therethrough, said annular wall having a first and second end, said first end being open to provide access to said cylindrical opening and having an annular flange extending from said inner surface of said annular wall into said opening in said first end;
   b. at least one set of ratchet teeth positioned around a portion of said outer surface of said annular wall at said second end;
   c. at least ten threads angularly positioned on said annular wall between said first end and said ratchet teeth each of said treads extending around said surface less than 90° and wherein said threads are discotinuous at a mold parting line; and
   d. a first annular ring flange on and extending substantially around said outer surface of said annular wall adjacent to said set of ratchet teeth, said first annular ring flange adopted to engage an associated ring flange on a cap to sealing position said cap onto said neck.

2. A neck finish for a container as set forth in claim 1 including a second annular ring flange positioned on said outer surface of said annular wall between said first end and said threads.

3. A neck finish for a container as set forth in claim 1 or 2 wherein said annular ring flanges includes a circumferential lip.

4. A tamper-evident cap in combination with the neck finish of claim 1, said tamper-evident cap comprising:
   a. a closure member having a cover with a substantially circular periphery, said closure member having an annular wall depending from said periphery and including an internal surface;
   b. a removable tamper-evident band circumferentially positioned around said depending annular wall opposite from said cover, said tamper-evident band including at least one internal neck finish engagement means;
   c. a first annular ring flange position around said internal surface of said depending annular wall adjacent said tamper-evident band adopted to engage said first annular ring flange of said neck to sealing position said cap on said neck finish;
   d. an annular valve depending from said cover and spaced apart from said internal surface of said annular depending wall a distance sufficient to sealingly engage said annular flange of said neck finish; and
   e. at least ten threads spaced apart and helically positioned on said internal surface of said annular depending wall extending from about said first annular ring flange to proximate said closure member each of said threads extending less than 180°.

5. A tamper evident cap as set forth in claim 4 made from high density polyethylene.

6. A tamper evident cap as set forth in claim 4 made from low density polyethylene.

7. A tamper-evident cap as set forth in claim 4 including a second annular ring flange positioned between said cover of said closure member and said helical threads.

8. A tamper-evident cap as set forth in claim 4 or 7 wherein said annular ring flanges includes a circumferential lip.

9. A tamper evident cap as set forth in claim 4 or 7 wherein said helical threads extend less than 270° around said internal surface.

10. A tamper-evident cap as set forth in claim 4 or 7 wherein said threads each extend around said internal surface less than 90°.

11. A neck finish for a container and a tamper-evident cap for the neck finish comprising:
    a. an annular wall on the neck finish defining a cylindrical opening therethrough into the container at a first end and having an external surface;
    b. at least one set of ratchet teeth positioned around a portion of said external surface of said annular wall at a second end;
    c. a first annular flange ring on said external surface between said cylindrical opening and said ratchet teeth;
    d. at least ten threads helically positioned on said external surface between said first end and said ratchet teeth and extending less than 180° and being discontinuous at a mold part line;
    e. said cap having a closure on a first end annular wall for closing said cylindrical opening in the neck finish, said closure having a depending annular wall around the periphery of said closure, said depending annular wall having an internal surface;
    f. a tamper-evident band circumferentially positioned around a second end of said depending annular wall of the cap and having at least one set of ratchet teeth for engaging said ratchet teeth on the neck finish;
    g. a first annular ring flange positioned around said internal surface of said depending annular wall for engaging said first annular ring flange on the neck finish; and
    h. at least ten threads spaced apart and helically positioned on said first annular ring flange and said closure, said threads on the cap being equal in number and helical angle to said at least ten threads on the neck finish.

12. A neck finish for a container as set forth in claim 1 or 11, wherein said annular wall includes a pair of molding part lines and said helical threads are discontinuous at said part lines.

13. A tamper-evident cap comprising:
    a. a closure member at a first end with a depending annular wall around the periphery of said closure member, said annular wall having an internal surface;
    b. a tamper-evident band circumferentially positioned around a second end of said depending annular wall;
    c. a first annular ring flange positioned around said internal surface of said depending annular wall; and
    d. at least ten threads spaced apart and helically positioned on said internal surface of said annular depending wall between said first annular ring flange and said closure member and each of said threads extending less than 90° around said surface and having a lead-in adjacent said first annular ring flange to permit snapping on said cap to a neck finish.

14. A tamper-evident cap as set forth in claim 13 including a second annular ring flange, said first annular ring flange positioned between said tamper-evident band and said helical threads, and said second annular ting flange positioned between said closure member and said helical threads.

15. A neck finish and tamper-evident cap as set forth in claim 14, including second annular ring flanges positioned on the neck finish and cap, respectively, in interengaging relationship.

16. A neck finish and tamper-evident cap as set forth in claim 14, including breakable means on said annular depending wall of the cap between said threads and said second annular ring flange for breaking upon removal of the cap from the container.

* * * * *

UNITED STATES PATENT AND TRADEMARK OFFICE
CERTIFICATE OF CORRECTION

PATENT NO. : 5,553,727
DATED : September 10, 1996
INVENTOR(S) : MOLINARO, Luca

It is certified that error appears in the above-identified patent and that said Letters Patent is hereby corrected as shown below:

In column 3, line 60, add the words "that extend over a part line 25" after the words "threads 24"

In column 4, line 56, add the words "lip or" after the word "annular" in both occurrences In column 4, line 65, change the word "bank" to "band"

In column 5, line 24, the words "treads' should be "threads"

In column 5, line 37, the word "includes" should be "include"

In column 7, line 1, the word "ting" should be "ring"

Signed and Sealed this

Twenty-fourth Day of November, 1998

Attest:

BRUCE LEHMAN

Attesting Officer

Commissioner of Patents and Trademarks